US 6,759,154 B2

(12) United States Patent
O'Brien et al.

(10) Patent No.: US 6,759,154 B2
(45) Date of Patent: Jul. 6, 2004

(54) WATER RECOVERY FOR A FUEL CELL SYSTEM

(75) Inventors: John F. O'Brien, Lockport, NY (US); Malcolm J. Grieve, Fairport, NY (US); Michael T. Faville, Geneseo, NY (US); John Noetzel, Fairport, NY (US); Juergen Ringler, Kissing (DE); Juergen Kammerer, Munich (DE)

(73) Assignees: Delphi Technologies, Inc., Troy, MI (US); Bayerische Motoren Werke Aktiengesellsha (DE)

(*) Notice: Subject to any disclaimer, the term of this patent is extended or adjusted under 35 U.S.C. 154(b) by 207 days.

(21) Appl. No.: 09/795,065

(22) Filed: Feb. 26, 2001

(65) Prior Publication Data

US 2002/0119354 A1 Aug. 29, 2002

(51) Int. Cl.$^7$ ................................................. H01M 8/04
(52) U.S. Cl. ............................. 429/17; 429/19; 429/20; 429/30; 429/32; 429/39; 29/623.1
(58) Field of Search ............................. 429/20, 17, 32, 429/30, 39, 19; 29/623.1

(56) References Cited

U.S. PATENT DOCUMENTS

| 6,132,842 A | * | 10/2000 | Simmons, Jr. et al. ......... 429/13 |
| 6,312,842 B1 | * | 11/2001 | Reiser et al. .................. 429/13 |
| 6,475,652 B2 | * | 11/2002 | Grasso et al. ................. 429/13 |
| 2002/0110507 A1 | * | 8/2002 | Grieve et al. ................ 422/199 |

FOREIGN PATENT DOCUMENTS

| JP | 05-082147 | 4/1993 |
| JP | 05-340594 | 12/1993 |
| JP | 07-167482 | 7/1995 |
| JP | 2000-097478 | 4/2000 |

* cited by examiner

*Primary Examiner*—Patrick Ryan
*Assistant Examiner*—Angela J Martin
(74) *Attorney, Agent, or Firm*—Jimmy L. Funke

(57) ABSTRACT

A fuel cell system is disclosed. A fuel cell stack is in fluid communication with a reformer. An air conditioning system is in fluid communication with the reformer. Methods of making and using a fuel cell system are also disclosed.

36 Claims, 1 Drawing Sheet

WATER RECOVERY FOR A FUEL CELL SYSTEM

BACKGROUND

A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposite sides of an electrolyte. The oxidant passes over the oxygen electrode (cathode) while the fuel passes over the fuel electrode (anode), generating electricity, water, and heat. There are several types of fuel cells, including proton exchange membrane (PEM) fuel cells and solid oxide fuel cells (SOFC).

In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

The fuel cell stack also includes conduits or manifolds to allow passage of the fuel and oxidant into and byproducts, as well as excess fuel and oxidant, out of the stack. Generally, oxidant is fed to the structure from a manifold located on one side of the stack, while fuel is provided from a manifold located on an adjacent side of the stack. The fuel and oxidant are generally pumped through the manifolds and introduced to a flow field disposed adjacent to the appropriate electrode. The flow fields that direct the fuel and oxidant to the respective electrodes, typically create oxidant and fuel flows across the electrodes that are perpendicular to one another.

The long term successful operation of a fuel cell depends primarily on maintaining structural and chemical stability of fuel cell components during steady state conditions, as well as transient operating conditions such as cold startups and emergency shut downs. The support systems are required to store and control the fuel, compress and control the oxidant and provide thermal energy management. A fuel cell can be used in conjunction with a reformer that converts a fuel to hydrogen and carbon monoxide (the reformate) usable by the fuel cell. Three types of reformer technologies are typically employed (steam reformers, dry reformers, and partial oxidation reformers) to convert hydrocarbon fuel (methane, propane, natural gas, gasoline, etc) to hydrogen using water, carbon dioxide, and oxygen, respectfully, with byproducts including carbon dioxide, carbon monoxide, and water, accordingly.

The fuel cell system is dependent upon the reformate created. Steam processing of fuels is efficient since it produces a greater amount of fuel per unit of pre-reformed fuel than the partial oxidation reformer. However, storage of water for supply to the fuel cell system requires a large amount of space, additional weight, and time-consuming maintenance.

SUMMARY

The drawbacks and disadvantages of the prior art are overcome by water recovery for a fuel cell system.

A fuel cell system is disclosed. A fuel cell stack is in fluid communication with a reformer, which is in fluid communication with an air conditioning system.

A method of making a fuel cell system is also disclosed. The method comprises disposing a reformer in fluid communication with a fuel cell stack and disposing an air conditioning system in fluid communication with the reformer.

A method of using a fuel cell system is also disclosed. The condensate from an air conditioning system is directed to a reformer. The reformer is operated to produce a reformate and the reformate is utilized in a fuel cell stack to produce electricity.

A fuel cell system is disclosed. The fuel cell system comprises a means for producing electricity from a reformate, a means for producing the reformate from a condensate, and a means for producing the condensate from air.

A fuel cell system is disclosed. The fuel cell system comprises a proton exchange membrane fuel cell stack and an air conditioning system in fluid communication with the proton exchange membrane fuel cell stack.

A method of using a fuel cell system is disclosed. The method comprises producing a condensate in an air conditioning system and hydrating a proton exchange membrane fuel cell with at least a portion of the condensate.

The above described and other features are exemplified by the following figures and detailed description.

BRIEF DESCRIPTION OF THE DRAWINGS

Referring now to the figures, wherein like elements are numbered alike in the several figures.

DETAILED DESCRIPTION

A fuel cell system may be utilized with an engine to operate a vehicle. The power created from the engine and the fuel cell can propel a vehicle, as well as providing electricity and heat for the auxiliary systems. The created electricity can be provided to an air conditioning system for climate control in the vehicle. The air conditioning system, in turn, creates water as a byproduct, which can be recovered for use in the reformer of the fuel cell system.

Generally, a fuel cell system may comprise at least one fuel cell (preferably, SOFC or PEM), an engine, one or more heat exchangers, and optionally, one or more compressors, an exhaust turbine, a catalytic converter, preheating device, plasmatron, electrical source (e.g., battery, capacitor, motor/generator, turbine, and the like, as well as combinations comprising at least one of the foregoing electrical sources), and conventional connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators, and the like, as well as conventional components.

Figure 1:
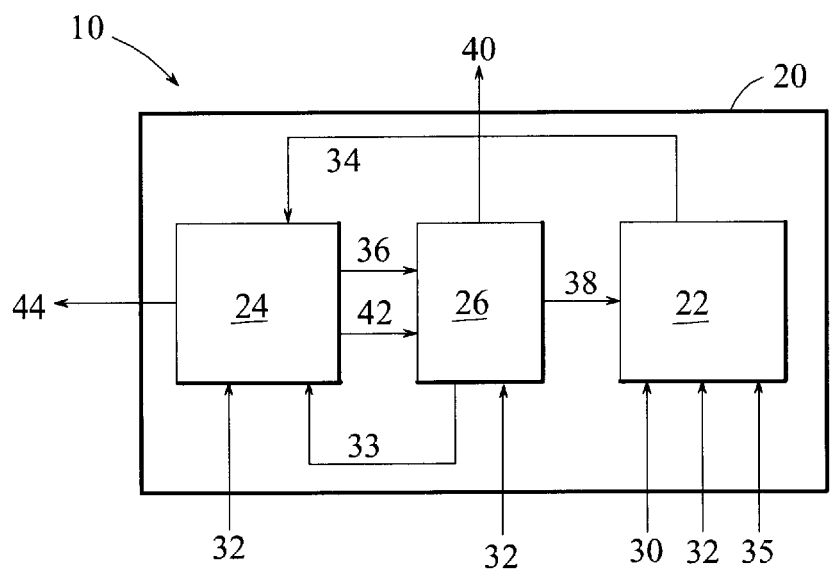
FIG. 1 is a schematic of an exemplary fuel cell system.

The recovery of water for a fuel cell system described herein utilizes a SOFC system, although any fuel cell system, including SOFC systems and PEM fuel cell systems, can be used. Referring now to FIG. 1, a fuel cell system 10 is schematically depicted. The fuel cell system 10 comprises a fuel cell stack 24, preferably contained within an enclosure 20 for thermal management (also referred to as a "hot box"). The fuel cell stack 24, which may also comprise a plurality of modular fuel cell stacks, is generally coupled to a fuel (or reformate) inlet 34, an exterior air (or oxidant) supply inlet 32, and a heated air (or oxidant) supply inlet 33.

To facilitate the reaction in the fuel cell, a direct supply of fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, availability, and environmental issues relating to the fuel.

Possible sources of fuel include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and combinations comprising at least one of the foregoing fuels. The preferred fuel is typically based upon the power density of the engine, with lighter fuels, i.e. those which can be more readily vaporized and/or conventional fuels which are readily available to consumers, generally preferred.

Located within the fuel cell system enclosure 20, is the reformer system 22 that comprises a main reformer, and optionally, a micro-reformer. The reformer 22 is provided with a fuel through a fuel inlet 30, an exterior air (or oxidant) inlet 32, and a water supply inlet 35. The reformer system 22 can be thermally isolated from the fuel cell stack 24 (i.e., a segmented enclosure, isolated enclosure, or the like). The processing or reforming of hydrocarbon fuels, such as gasoline, is completed to provide an immediate fuel source for rapid start up of the fuel cell as well as protecting the fuel cell by removing impurities. Fuel reforming can be used to convert a hydrocarbon (such as gasoline) or an oxygenated fuel (such as methanol) into hydrogen ($H_2$) and byproducts (e.g., carbon monoxide (CO), carbon dioxide ($CO_2$), and water). Common approaches include steam reforming, partial oxidation, and dry reforming.

Steam reforming systems involve the use of a fuel and steam ($H_2O$) that is reacted in heated tubes filled with catalysts to convert the hydrocarbons into principally hydrogen and carbon monoxide. An example of the steam reforming reaction is as follows:

$$CH_4 + H_2O \rightarrow CO + 3H_2$$

Partial oxidation reformers are based on substoichiometric combustion to achieve the temperatures necessary to reform the hydrocarbon fuel. Decomposition of the fuel to primarily hydrogen and carbon monoxide occurs through thermal reactions at high temperatures of about 700° C. to about 1,000° C. The heat required to drive the reaction is typically supplied by burning a portion of the fuel. Catalysts have been used with partial oxidation, systems (catalytic partial oxidation) to promote conversion of various sulfur-free fuels, such as ethanol, into synthesis gas. The use of a catalyst can result in acceleration of the reforming reactions and can provide this effect at lower reaction temperatures than those that would otherwise be required in the absence of a catalyst. An example of the partial oxidation reforming reaction is as follows:

$$CH_4 + \tfrac{1}{2}O_2 \rightarrow CO + 2H_2$$

Dry reforming involves the creation of hydrogen and carbon monoxide in the absence of water, for example using carbon dioxide. An example of the dry reforming reaction is depicted in the following reaction:

$$CH_4 + CO_2 \rightarrow 2CO + 2H_2$$

The reformer system 22, preferably utilizing a steam reformer, creates a reformate 34 for use by the fuel cell system 24. The fuel cell system 24 uses this reformate 34 to create electrical energy 44 for harnessing and waste byproducts; thermal energy, spent/unreacted fuel 36, and spent air 42. Thermal energy from the flow of spent/unreacted fuel 36 can optionally be recovered in a waste energy recovery system 26, which can recycle the flow of fuel 38 and waste heat combined with oxidant from an exterior air (or oxidant) inlet 32, to the fuel reformer 22 and can also discharge a flow of reaction products (e.g., water and carbon dioxide) 40 from the system. Alternatively, some or all of the spent/unreacted fuel 36 may be introduced to an engine (not shown) or a turbine (not shown) for energy recovery. Additionally, unreacted oxygen and other air constituents 42 are discharged from the fuel cell stack 24. Ultimately, electrical energy 44 is harnessed from the fuel cell for use by a motor vehicle (not shown) or other appropriate energy sink.

As indicated above, the preferred reformer system includes the use of a steam reformer. A steam reformer is more efficient since it produces a greater amount of fuel per unit of pre-reformed fuel than the partial oxidation reformer. However, a steam reformer requires a source of water (i.e., steam) to produce the necessary reactions in creating a reformate. Conventional systems require that canisters of water be stored near the reformer. This requires much space and maintenance to ensure the proper amount of water is available to the system.

Figure 2:
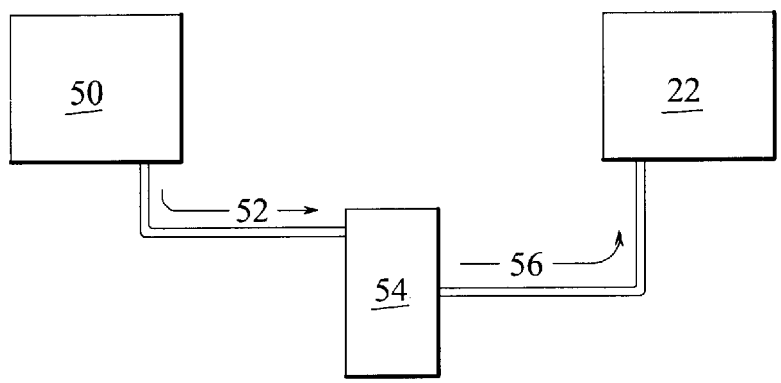
FIG. 2 is a schematic of an exemplary fuel cell system incorporating recovery of water from the air conditioning system through a reservoir.
Figure 3:
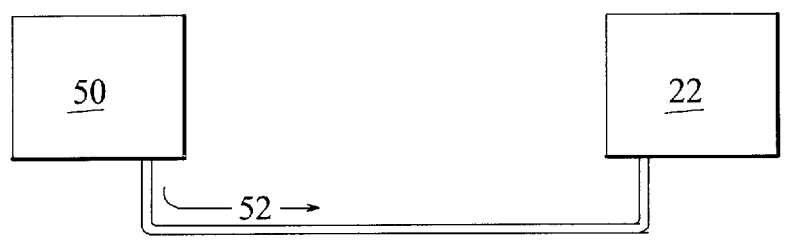
FIG. 3 is a schematic of an exemplary fuel cell system incorporating recovery of water from the air conditioning system.

To avoid the requirements of space and maintenance, a possible source of water that can be harnessed for use by the reformer is from the air conditioning system. As part of the process of removing thermal energy from the air, the air conditioning system condenses water vapor from the air, collects it, and discharges the water from the air conditioning system. As illustrated in FIG. 2, a flow of condensate 52 from the air conditioning system 50 can be directed to the reformer system 22. This condensate can constitute all, or at least a portion of the reformer's water supply. Preferably, condensate 52 from the air conditioning system 50 is directed to a storage vessel or reservoir 54 for storage until the flow of condensate 56 is needed by the reformer system 22. The reservoir 54 can include a device for purifying the condensate to at least partially, or completely, remove unnecessary components to improve its quality and purity. Such purification devices can include filters, deionizers, and distillers and combinations comprising at least one of the foregoing devices. In the alternative, the flow of condensate 52 can be directly connected to the reformer system 22, as illustrated in FIG. 3.

The air conditioning system circulates a flow of warm moist air from outside the system with a blower. Moisture from the air is condensed on an evaporator in the air conditioning system creating water as a byproduct. This water can be directed to the fuel cell system reformer (See FIGS. 2 and 3). Although traditionally the primary function of the air conditioning system is to provide cabin comfort, there may be an opportunity to enhance the production of condensate from the air conditioning system for use by the reformer. In order to provide an ample water supply for the reformer, the mass flow rate of warm moist air from outside flowing through the evaporator can be biased (either higher or lower) thereby accommodating both the cabin comfort and reformer condensate requirements. This can be accomplished by adjusting the speed of the blower in the air conditioning system and/or varying the air distribution and temperature control valves. Additionally, in order to optimize the production of condensate from the air conditioning system, sensors and electronic controls could be utilized that would determine a reservoir water level (indicative of the desired condensate level), an ambient air temperature and humidity level (indicative of the potential for condensate generation), and a cabin temperature and humidity level (indicative of the level of cabin comfort) that when interpreted, could allow for the air control biases described above. This would, in turn, produce more or less condensate as the cabin comfort system allows, the reformer system needs, and the ambient air allows. In other words, the amount of condensate produced can be controlled to enable the maintenance of a sufficient water reservoir for use in the reformer.

In a case where a sufficient supply of water is not provided by the air conditioning system and/or during system start-up, the reformer system can be operated utilizing a partial oxidation reaction process. Employment of the partial oxidation process eliminates the need for water in the production of reformate, while producing heat capable of bringing the fuel cell up to the desired temperature. Alternatively, some or all of the water produced in the fuel cell can be directed for use in the reformer. Thereby, supplying the reformer with water until the flow of water from the air conditioning system is restored.

During operation, the air conditioning system produces a condensate that is captured and directed to the reformer. The reformer uses this supply of water in reforming various types of fuel to produce a reformate, i.e., fuel for a fuel cell. The reformate is then utilized by the fuel cell stack in its production of electricity.

In an alternative process, the reformer can be by-passed, with at least a portion of all of the condensate from the air conditioning system utilized in a PEM fuel cell system, e.g., as the water management. Water is utilized by a PEM fuel cell for hydrating the anode and cathode input gases during the operation of the PEM fuel cell The use of water from the air conditioning system provides a more efficient source of water without requiring the owner to constantly maintain the levels of water required for the fuel cell system. Likewise, by supplying water from the air conditioning system system, the requirement of storage space for water canisters is relieved.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A fuel cell system, comprising:
    a fuel cell stack;
    a reformer in fluid communication with said fuel cell stack; and
    an air conditioning system configured to produce a condensate, said condensate produced by said air conditioning system is in direct fluid communication with said reformer, wherein said direct fluid communication of condensate between said air conditioning system and said reformer allows elimination of a canister configured to store water for said reformer.

2. The fuel cell system of claim 1, wherein said fuel cell stack comprises solid oxide fuel cells.

3. The fuel cell system of claim 1, wherein said fuel cell stack comprises proton exchange membrane fuel cells.

4. The fuel cell system of claim 1, wherein said reformer is a steam reformer and/or a partial oxidation reformer.

5. The fuel cell system of claim 1, further comprising a reservoir in fluid communication with said air conditioning system and said reformer.

6. The fuel system of claim 5, wherein said reservoir further comprises a device selected from the group consisting of filters, dieonizers, distillers, and combinations comprising at least one of the foregoing devices.

7. A method of making a fuel cell system, comprising:
    disposing a reformer in fluid communication with a fuel cell stack; and
    disposing an air conditioning system in fluid communication with said reformer, said air conditioning system configured to produce a condensate, said condensate produced by said air conditioning system is in direct fluid communication with said reformer, wherein said direct fluid communication of condensate between said air conditioning system and said reformer allows elimination of a canister to store water for said reformer.

8. The method of claim 7, wherein said fuel cell stack comprises solid oxide fuel cells.

9. The method of claim 7, wherein said fuel cell stack comprises proton exchange membrane fuel cells.

10. The method of claim 7, further comprising disposing a reservoir in fluid communication with said air conditioning system and said reformer.

11. The method of claim 10, further comprising purifying a condensate in said reservoir.

12. The method of claim 7, wherein said reformer is a steam reformer and/or a partial oxidation reformer.

13. A method of using a fuel cell system, comprising:
    directing a condensate from an air conditioning system to a reformer;
    producing a reformate in said reformer; and
    utilizing said reformate in a fuel cell stack to produce electricity.

14. The method of claim 13, wherein said fuel cell stack comprises solid oxide fuel cells.

15. The method of claim 13, wherein said fuel cell stack comprises proton exchange membrane fuel cells.

16. The method of claim 13, wherein said reformer is a steam reformer and/or a partial oxidation reformer.

17. The method of claim 13, further comprising collecting said condensate in a reservoir disposed between said reformer and said air conditioning system.

18. The method of claim 17, further comprising purifying said condensate in said reservoir.

19. The method of claim 13, further comprising controlling said air conditioning system to optimize production of said condensate.

20. The method of claim 19, further comprising adjusting a flow of air into said air conditioning system.

21. The method of claim 19, further comprising adjusting a speed of a blower in said air conditioning system.

22. A fuel cell system, comprising:
    a means for producing electricity from a reformate;
    a means for producing said reformate from a condensate directed thereto; and
    a means for producing said condensate from air without a need to store said condensate.

23. The fuel system of claim 22, wherein said reformer is a steam reformer and/or a partial oxidation reformer.

24. The fuel system of claim 22, further comprising a means for storing said condensate disposed in fluid communication with said means for producing said reformate.

25. The fuel system of claim 22, wherein said means for storing said condensate comprises a means for purifying said condensate.

26. A fuel cell system, comprising:

a proton exchange membrane fuel cell stack; and an air conditioning system in fluid communication with said proton exchange membrane fuel cell stack, said air conditioning system configured to produce a condensate, said condensate produce by said air conditioning system is in direct fluid communication with said proton exchange membrane fuel cell stack, wherein said direct fluid communication of condensate between said air conditioning system and said reformer allows elimination of a separate canister to store water for said reformer.

27. The fuel cell system of claim 26, further comprising a reservoir in fluid communication with said air conditioning system and said proton exchange membrane fuel cell stack.

28. The fuel cell system of claim 27, wherein said reservoir further comprises a device selected from the group consisting of filters, deionizers, distillers, and combinations comprising at least one of the foregoing devices.

29. A method of using a fuel cell system, comprising:

producing a condensate in an air conditioning system; and hydrating a proton exchange membrane fuel cell with at least a portion of said condensate without a need to store said condensate.

30. A fuel cell system, comprising:

a solid oxide fuel cell stack;

a steam reformer in thermal communication and fluid communication with said fuel cell stack; and an air conditioning system in fluid communication with said reformer such that condensate from the air conditioning system can be directed to the reformer.

31. The fuel cell system of claim 30, further comprising an engine, wherein said fuel cell stack is in electrical communication with at least one of a light a resistive heater, a blower, a stereo system, and a computer system.

32. The fuel cell system of claim 30, wherein said fuel cell stack is in electrical commmunication with said air conditioning system.

33. A method of makeing a fuel cell system, comprising:

disposing a steam reformer in thermal communication and fluid communication with a solid oxide fuel cell stack such that reformate produced in said reformer can be directed to said fuel cell stack and thermal energy produce in said fuel cell stack can be directed to said reformer, and disposing an air conditioning system in fluid communication with said reformer such that condensate from the air conditioning system can be directed to said reformer.

34. The method of claim 33, further comprising disposing the fuel cells stack (24) in electrical communication with said air conditioning system.

35. A method of using a fuel cell system, comprising:

directing a condensat from an air conditioning system to a steam reformer, producing a reformate in said reformer;

utilizing said reformate in a solid oxide fuel cell stack to produce electricity and thermal energy; and utilizing said thermal energy in said reformer.

36. The method of claim 35, further comprising utilizing said electricity in said air conditioning system.

* * * * *